Nov. 25, 1930.  E. J. GUAY ET AL  1,783,040
MACHINE FOR FORMING RINGS OF SEGMENTAL PIECES
Filed Aug. 19, 1927  4 Sheets-Sheet 1

Inventors:
Emile J. Guay, Deceased,
Fred Germain, Administrator;
Fredrick S. Godfrey.
by
Their Attorney.

Nov. 25, 1930.  E. J. GUAY ET AL  1,783,040
MACHINE FOR FORMING RINGS OF SEGMENTAL PIECES
Filed Aug. 19, 1927  4 Sheets-Sheet 2

Inventors:
Emile J. Guay, Deceased,
Fred Germain, Administrator,
Fredrick S. Godfrey.
by
Their Attorney.

Nov. 25, 1930.   E. J. GUAY ET AL   1,783,040
MACHINE FOR FORMING RINGS OF SEGMENTAL PIECES
Filed Aug. 19, 1927   4 Sheets-Sheet 3

Inventors:
Emile J. Guay, Deceased,
Fred Germain, Administrator,
Fredrick S. Godfrey.
by
Their Attorney Nov. 25, 1930.  E. J. GUAY ET AL  1,783,040

MACHINE FOR FORMING RINGS OF SEGMENTAL PIECES

Filed Aug. 19, 1927  4 Sheets-Sheet 4

Inventors:
Emile J. Guay, Deceased.
Fred Germain, Administrator;
Fredrick S. Godfrey.
by
Their Attorney.

Patented Nov. 25, 1930

1,783,040

UNITED STATES PATENT OFFICE

EMILE J. GUAY, DECEASED, LATE OF SWAMPSCOTT, MASSACHUSETTS, BY FRED GERMAIN, ADMINISTRATOR, OF SWAMPSCOTT, MASSACHUSETTS, AND FREDRICK S. GODFREY, OF LYNN, MASSACHUSETTS, ASSIGNORS TO GENERAL ELECTRIC COMPANY, A CORPORATION OF NEW YORK

MACHINE FOR FORMING RINGS OF SEGMENTAL PIECES

Application filed August 19, 1927. Serial No. 214,188.

In certain manufacturing processes it is desirable to form structures, such as rings for example, of some thickness from comparatively thin pieces, the pieces being cut and stacked successively one on another in partial overlapping relation and afterwards fastened together.

The object of the present invention is to provide an improved machine for automatically cutting pieces and stacking them in the referred to manner, and for a consideration of what is considered to be novel and the invention, attention is directed to the accompanying specification and the claims appended thereto.

Figure 1:
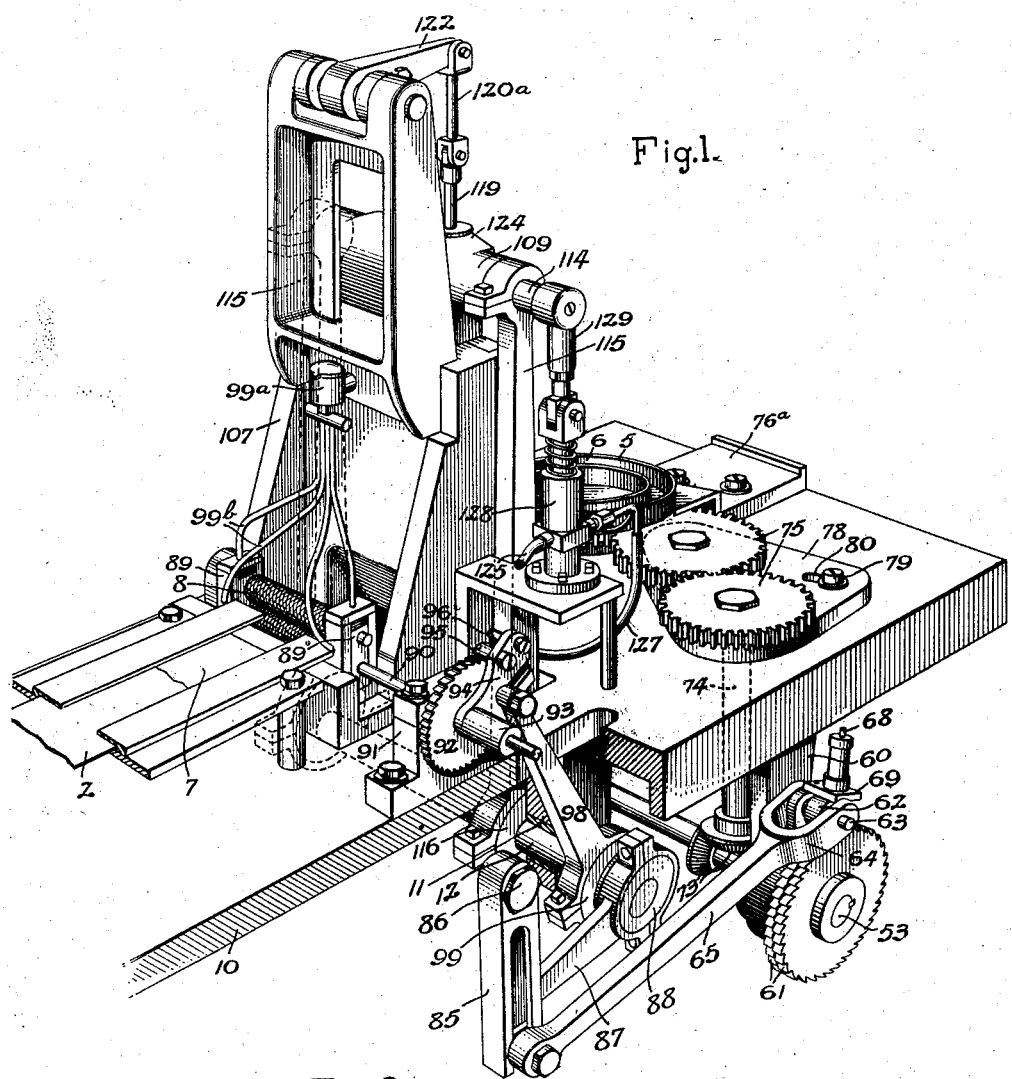
Figures 2, 3:
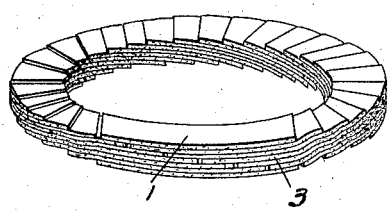
Figure 4:
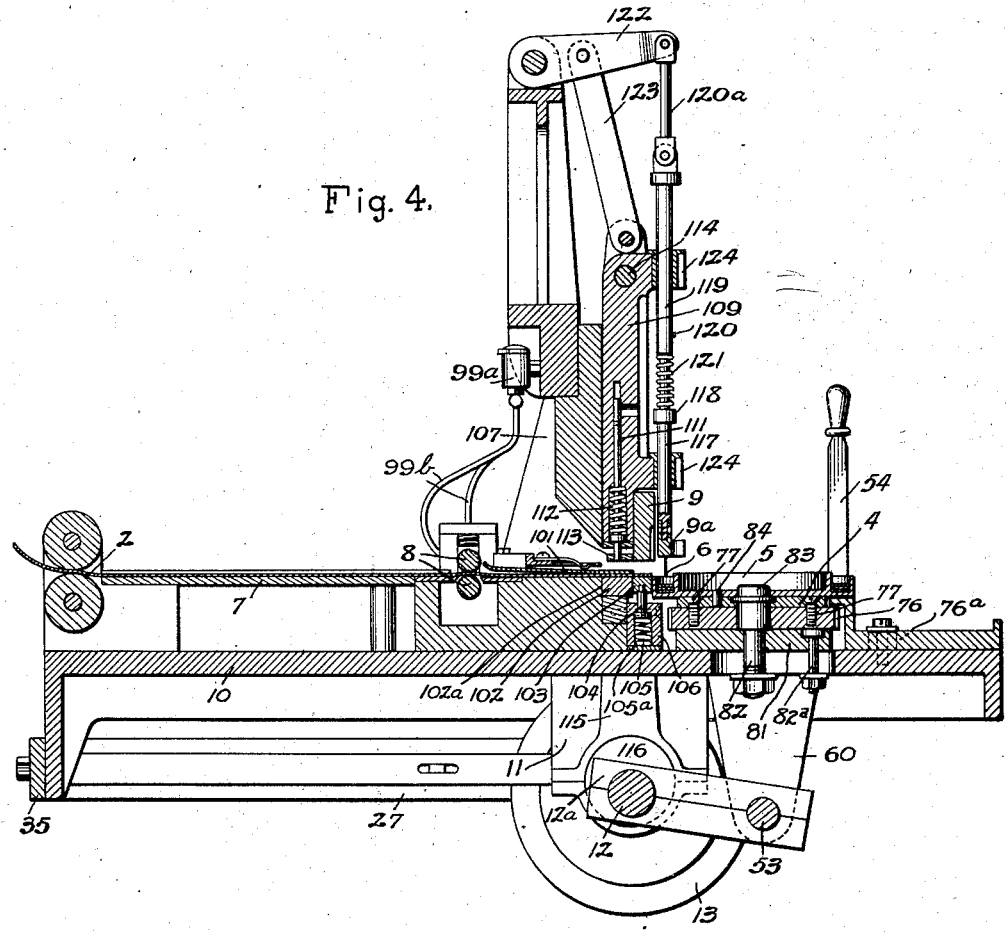
Figure 5:
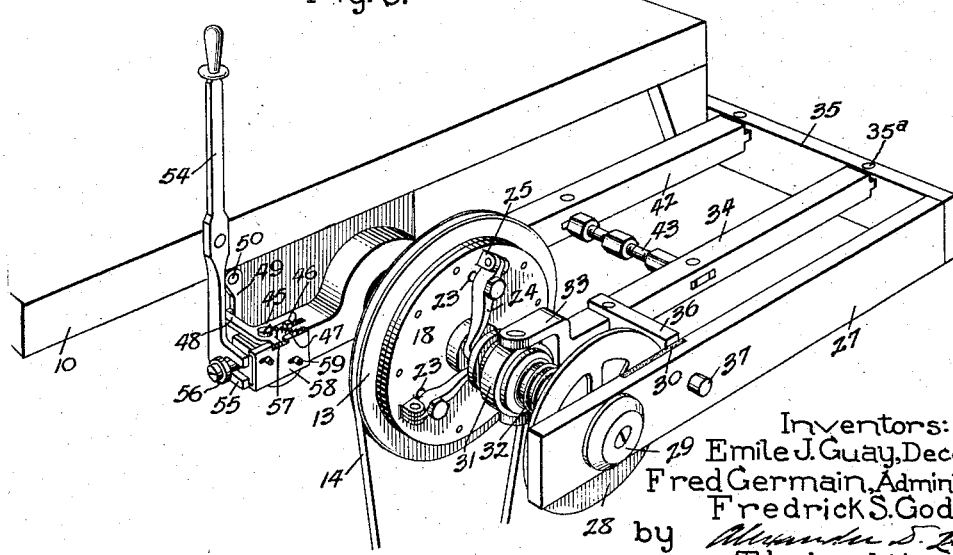
Figure 6:
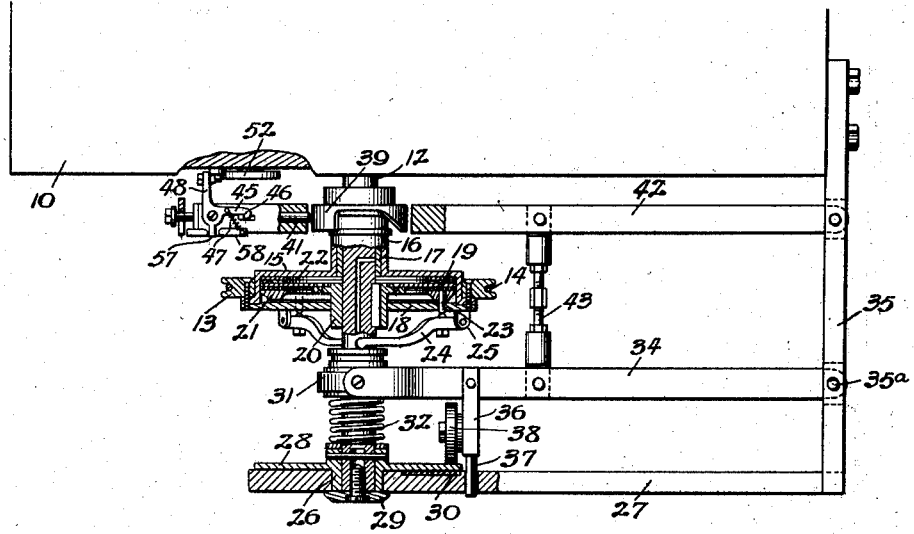
Figure 7:
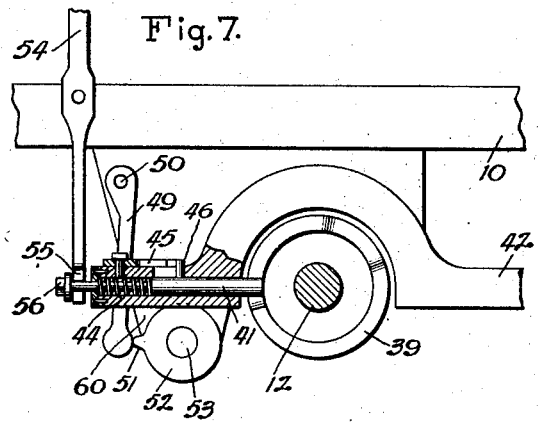
Figure 8:
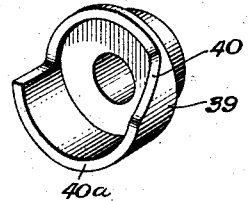
Figure 9:
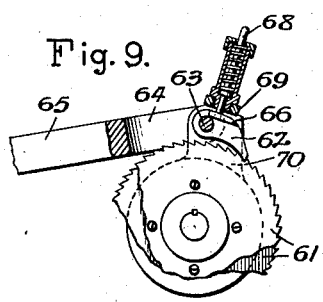
Figure 10:
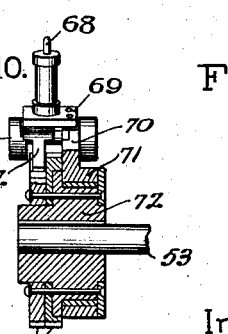
Figure 11:
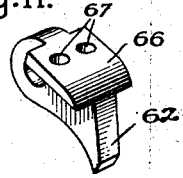
Figure 12:
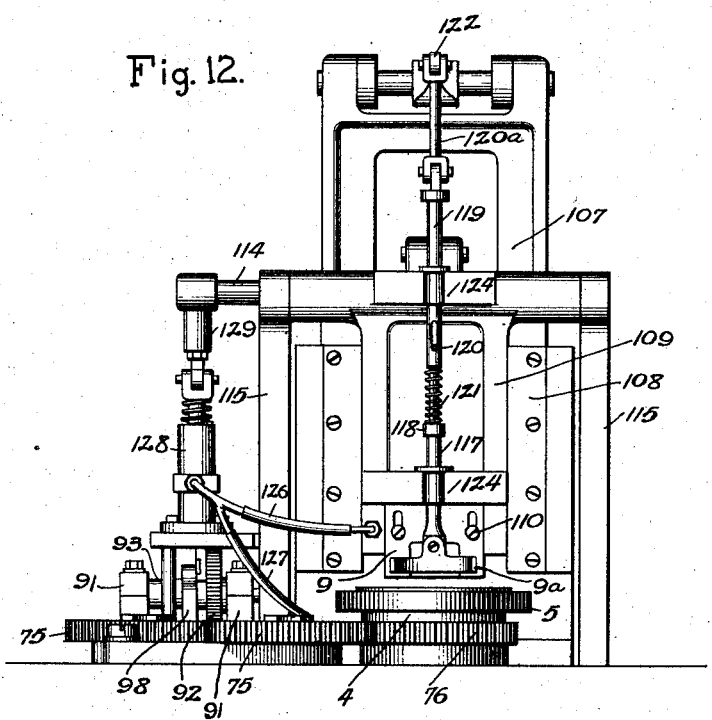
Figure 13:
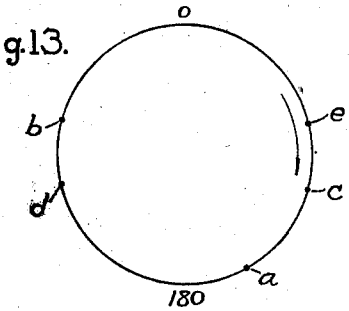

In the drawing, Fig. 1 is a perspective view with certain parts broken away of a machine embodying the invention; Fig. 2 is a perspective view of a ring formed from segments, which the machine is designed to make; Fig. 3 is a face view of one of the segments used in making a ring such as that shown in Fig. 2; Fig. 4 is a longitudinal sectional view through the machine; Fig. 5 is a perspective view showing the driving mechanism for the machine; Fig. 6 is a sectional plan view of the construction shown in Fig. 5; Fig. 7 is a detail plan view on a larger scale of certain of the parts shown in Fig. 6; Fig. 8 is a perspective view of a face cam used in operating a clutch and brake mechanism; Figs. 9, 10 and 11 are detail views of certain of the operating parts of the mechanism; Fig. 12 is a face view of a portion of the machine, and Fig. 13 is a circle diagram.

Referring first to Figs. 2, 3 and 4, the purpose of the machine is to cut segmental pieces 1 such as is shown in Fig. 3 from a long strip of material as is shown at 2 in Fig. 4 and stack them one on another in partial overlapping relation to form a built-up ring 3 such as that shown in Fig. 2, several layers of the segments being present in the complete ring. In the present instance, the material from which the segmental pieces are cut comprises canvas treated with an adhesive binder such as a phenolic condensation product, and after being formed the rings 3 are used in the manufacture of non-metallic gear wheels. A non-metallic gear wheel embodying in its manufacture rings of the type shown in Fig. 2 is illustrated and described in the patent to Guay, 1,501,028, dated July 8, 1924.

Considering the machine generally, it comprises a turn table 4 (Figs. 4 and 12) upon which a holder 5 may be placed, the holder having an annular groove 6 in which the segments are laid, and means for imparting a step-by-step turning movement to the table; a guide way 7 (Figs. 1 and 4) for strip 2 and rollers 8 to which intermittent turning motion is imparted for feeding forward strip 2; a cutter 9 and a presser foot $9^a$ (Figs. 4 and 12) which reciprocate together, the cutter being curved to cut a segment off the end of strip 2 and the presser foot being shaped to enter groove 6 in holder 5 and pack down the segments; and automatic means for stopping the machine when a ring is completed. Considering the circle diagram in Fig. 13, which illustrates the approximate timing of the machine, it will be seen that the cutter and presser foot move downward from 0° which represents their top position to 180° which represents their bottom positions and back from 180° to 360°. The point $a$ indicates the cut-off point at which the cutter severs the segment from the strip. The distance from $b$ to $c$ indicates the period during which the feed rolls are operated to feed forward strip 2; and the distance from $d$ to $e$ indicates the period during which the holder 5 is turned.

10 indicates a platform supported by legs, (not shown) and provided underneath with suitable bearings, one of which is shown at 11, in which the main driving shaft 12 is carried. 13 is a driving pulley mounted loosely on shaft 12 and adapted to be connected to it by a suitable clutch, a clutch of the type used in automobiles being illustrated. The pulley is connected by a belt 14 to a source of power, such as an electric motor (not shown). Referring to Figs. 5 and 6, pulley 13 comprises an offset web 15 having a hub 16 provided with a bearing lining 17 which runs on the shaft. Attached to the pulley is a cover plate 18 which with web 15 defines a clutch chamber. In the clutch chamber is a clutch plate 19 having a hub 20 splined to shaft 12. Clutch plate 19 has clutch facings at its peripheral portion and is adapted to be clutched between a clutch ring 21 and a clutch facing 22 on the inner surface of web 15. Clutch ring 21 is supported so it can move axially somewhat and is provided with a number of pins 23 which project through cover plate 18 and are adapted to be engaged by radially-extending arms 24 pivoted to posts 25 on the cover plate. When the inner ends of arms 24 are forced toward the left as viewed in Fig. 5, ring 21 is moved toward the left so that clutch plate 19 is clutched between ring 21 and facing 22 whereby the pulley is connected through the clutch plate to driving shaft 12. The one end of shaft 12 is fastened in a bearing sleeve 26 which turns in an opening in a frame piece 27. Shaft 12 is held from axial movement by a brake disk 28 on sleeve 26 and a collar 29 which are located at opposite sides of frame piece 27. Brake disk 28 is adapted to be forced into engagement with an insert 30 of friction material in frame piece 27. The inner ends of arms 24 are adapted to be engaged by a clutch collar 31 loosely mounted on shaft 12 and biased toward a position to engage arms 24 and hold the clutch "in" by a spring 32. Clutch collar 31 is carried in a yoke 33 on the end of a lever 34 pivoted to a frame piece 35 as is indicated at 35ª. Frame pieces 27 and 35 are rigidly fastened together and are supported by platform 10. On lever 34 is a link 36 having a guide pin 37 which slides in a hole in frame piece 27 and on the link is a roller 38 adapted to engage brake disk 28 and force it against insert 30. When clutch collar 31 is moved by spring 32 to hold the clutch in "in" position, roller 38 is moved away from brake disk 28 so as to release shaft 12 but when lever 34 is moved so as to move clutch collar 31 away from the ends of arms 24 to bring the clutch to "out" position, roller 38 forces brake disk 28 against friction insert 30 to stop promptly further rotation of shaft 12.

Lever 34 is moved to throw the clutch "out" and the brake "in" and to permit the clutch to move "in" and to release the brake by a face cam 39 having an inclined cam surface 40 and a flat surface 40ª. Cam surface 40 is adapted to engage a bolt 41 carried in the end of a lever 42 which is pivoted to frame piece 35 and is connected to lever 34 by an adjustable link 43. Bolt 41 is biased toward cam 39 by a spring 44 (see Fig. 7) but may be held in retracted position by a catch 45 pivoted on the top of lever 42, the catch being adapted to engage a pin 46 which is attached to bolt 41 and projects outward through a slot in the top of lever 42. As long as bolt 41 is held in retracted position, the clutch will remain "in", but when the pin is released it will be forced by spring 44 into engagement with the peripheral surface of cam 39 and during the first revolution thereafter of shaft 12 will move into the path of and be engaged by cam surface 40 and ride up such surface thereby effecting sidewise movement of lever 34 in a direction to release the clutch and apply the brake as explained already.

Catch 45 is held in engagement with pin 46 by a spring 47. Forming part of catch 45 is an arm 48 which projects toward platform 10 with its end overlying a depending link 49 (Figs. 5 and 7) pivoted on a stationary part of the platform as is indicated at 50. The lower end of depending link 49 is adapted to be engaged by a nose 51 on a cam 52 which cam is mounted on one end of a shaft 53. When nose 51 engages depending link 49 it moves the link toward the left (Fig. 7) thus turning arm 48 and thereby moving catch 45 from engagement with pin 46.

Pivoted on the side of platform 10 is an operating handle 54 having a fork 55 at its lower end which straddles the outer end of bolt 41 and is adapted to engage a shoulder 56 on the end of the bolt. By moving the lower end of handle 54 toward the left as viewed in Fig. 7 it will be seen that bolt 41 may be retracted to permit catch 45 to engage with pin 46. Catch 45 is provided also with a finger 57 (Figs. 5 and 6) located in a notch on the upper edge of a slide plate 58 which is attached to the side of lever 42 by headed screws 59, the plate 58 having slots through which the screws pass so that the plate may be moved relatively to lever 42. The ends of fork 55 stand in line with plate 58 so that by moving fork 55 toward the right as shown in Figs. 6 and 7, plate 58 may be brought into engagement with finger 57 so as to turn catch 45 and release bolt 41. By this means the bolt may be released and the machine stopped manually at any time. Handle 54 thus serves when moved in one direction to retract bolt 41 so that catch 45 may engage pin 46 and when moved in the other direction to move catch 45 from engagement with pin 46.

Shaft 53 on which cam 52 is located extends transversely of platform 10, being mounted in suitable bearings 60 carried by the underside of platform 10. 12ª is a friction brake for shaft 53, the brake being supported on shaft 12. It serves to prevent shaft 53 from overrunning. On the end of shaft 53 opposite that on which cam 52 is fastened are fixed ratchet wheels 61 adapted to be engaged by a pawl 62 provided on a pin 63 which in turn is mounted in a yoke 64 at the end of a connecting rod 65. Pawl 62 engages only one of the ratchet wheels 61 at a time and is adapted to be slid on pin 63 for engagement with either ratchet wheel and be locked in either position. To this end, pawl 62 has an enlarged portion 66 on its upper side provided with two openings 67 adapted to be engaged by a spring pressed pin 68 carried by a plate 69 fixed on the upper end of an oscillating supporting arm 70. Supporting arm 70 is carried by a sleeve 71 which is mounted to oscillate on a hub 72 which forms a part of and on which the ratchet wheels 61 are fastened. Supporting arm 70 has an opening through which pin 63 passes and forms an oscillating support for the end of connecting rod 65 and pawl 62. Pawl 62 can be moved from a position where it engages one of the ratchet wheels to a position where it engages the other by pulling pin 68 out of the one opening 67 and sliding the pawl sidewise on pin 63. The pawl is then fastened in position by permitting pin 68 to engage in the other hole 67. Shaft 53 is connected by bevel gears 73 (see Fig. 1) to a vertical shaft 74, and a pair of gear wheels 75 to a gear wheel 76 on the upper surface of which turn table 4 is fastened by screws 77, (Fig. 4). Gear wheels 75 are mounted on a plate 78 which is clamped to platform 10 by a stud 79, the stud extending through an arcuate slot 80 in plate 78, the center of the arc being the axis of shaft 74. Gear wheel 76 and turntable 4 are mounted on a separate plate 81 which is fastened to platform 10 by two bolts 82 and 82$^a$ which project through a slot in platform 10. By loosening stud 79 and bolts 82 and 82$^a$ plates 78 and 81 may be moved to adjust the position of turntable 4. This enables the turntable to be positioned so as to bring annular groove 6 of a holder 5 in correct position relatively to presser foot 9$^a$. This adjustment is required when different sized rings are to be made, it being clear that different sized rings require different sized holders 5. 76$^a$ is a guard for gear wheel 76.

Bolt 82 is provided with a head 83 which projects above turntable 4 and forms a centering pin for holder 5, the holder being provided with a central opening in which the centering pin is located. Adjacent head 83 is a pin 84 which engages a hole in the bottom of holder 5 to keep the holder from turning relatively to the turntable. Connecting rod 65 is adjustably connected to the lower end of an arm 85 pivoted at 86 to platform 10. In Fig. 1 of the drawing, the portion of the platform to which arm 85 is pivoted is broken away in order to show the parts beneath it. Arm 85 is oscillated by a link 87 connected at one end to arm 85 and at the other end to an eccentric 88 on the main driving shaft 12.

With the foregoing arrangement, it will be seen that each time driving shaft 12 makes a revolution, arm 85 is oscillated on its pivot pin 86, and through connecting rod 65 and pawl 62 the ratchet wheel 61 with which pawl 62 is engaged is moved one notch thereby turning shaft 53 through a predetermined angle and through the gearing connections moving turntable 4 and holder 5 through a certain angle. The amount holder 5 is turned depends, of course, upon the size and the number of teeth in ratchet 61 so that by utilizing ratchet wheels 61 of different sizes and having different numbers of teeth different amounts of turning movement of a holder 5 may be obtained.

Feed rollers 8 are provided with spindles mounted in suitable bearing blocks 89. The spindle of the lower roller is extended as shown at 90 in Fig. 1 and is mounted in suitable bearings 91. Fixed on spindle extension 90 is a ratchet wheel 92. Mounted to turn on spindle extension 90 is a hub 93 having an arm 94 which at its end carries a spring-pressed pawl 95 for engagement with ratchet wheel 92, the spring for the pawl being indicated at 96. Arm 94 is connected by a link 98 to an eccentric 99 on main driving shaft 12 the connection between link 98 and arm 94 being capable of adjustment in order to vary the movement of arm 94. With this arrangement, it will be seen that each time driving shaft 12 makes one revolution arm 94 will be oscillated to cause pawl 95 to advance ratchet wheel 92 one or more notches thereby turning feed rollers 8 a predetermined amount so as to feed forward strip 2 a certain amount. 99$^a$ is an oil reservoir from which oil is conveyed by pipes 99$^b$ to parts requiring lubrication.

On platform 10 is a table 100 (see Fig. 4) located partly in advance of feed rollers 8 and on the top of this table is a spring pressed guide 101 beneath which strip 2 is fed. The guide extends forward nearly to the forward edge of a lower cutter 102 located in a recess 102$^a$ in table 100 and having at its forward edge a curvature corresponding to that of the rear wall of cutter 9. In advance of cutter 102 is a small arc-shaped clamp 103 supported on the upper ends of a suitable number of pins 104, the pins in turn being supported on springs 105 contained in recesses 105$^a$ in a holder 106. Clamp 103 is of a size slightly narrower than one of the segments to be cut and of approximately the same length. It is onto this clamp that the end of strip 2 is fed by successive movements of feed rollers 8.

Projecting upwardly from platform 10 is a framework 107 provided with guide ways 108, (see Fig. 12) in which a head 109 is adapted to reciprocate. The cutter 9 already referred to, is attached to head 109 by studs 110. Mounted in recesses in head 109 and at the rear of cutter 9 are a number of spaced rods 111 pressed downwardly by springs 112. Attached to the lower ends of rods 111 is a curved plate 113 which engages the top of spring pressed guide 101 when head 109 moves downward so as to clamp strip 2 between the guide and cutter 102. Head 109 is carried on a shaft 114 which at its outer ends is connected by connecting rods 115 to eccentrics 116 on driving shaft 12. It will thus be seen that upon each revolution of shaft 12, head 109 is given one reciprocation.

Presser foot 9ª is connected to the lower end of a rod 117 provided with a shoulder 118 and a portion of reduced diameter which enters a recess in the lower end of a rod 119 and is fastened therein by a pin 120 which extends through a vertical slot in rod 119. Located between the lower end of rod 119 and shoulder 118 is a spring 121. This forms a yielding support for rod 117 permitting it to move relatively to rod 119. Rod 119 is connected by a link 120ª to the end of a lever 122 pivoted on the upper end of frame 107. Lever 122 is connected by a link 123 to the upper end of head 109 so that when head 109 reciprocates, it at the same time through link 123 and lever 122 imparts reciprocating motion to presser foot 9ª. The movement of presser foot 9ª is somewhat greater than that of head 109 and to permit of this movement rods 112 and 114 are carried in suitable bearings 124 on head 109 so that the rod may move relatively to the head.

It is desirable to keep dust formed during the cutting of the material from accumulating beneath curved plate 113 and beneath clamp 103 and for this purpose a suitable means is provided whereby air is blown into these spaces. In the present instance, there is provided an air supply pipe 125 which supplies air through pipes 126 and 127 to the respective spaces. 128 is a suitable valve controlling the flow of air from supply pipe 125 to pipes 126 and 127. The valve is operated by a link 129 which connects it to the end of shaft 114, the arrangement being such that upon each up and down movement of the cross head 109 the valve is opened to admit a blast of air through pipes 126 and 127 to such spaces. The air reaches the spaces through suitable openings (not shown) formed in rods 111 and in holder 106.

The operation is as follows:

Assuming that the machine is stopped, nose 51 on cam 52 would be in engagement with lower end of link 49 as shown in Fig. 7, catch 45 being released and pawl 41 being in engagement with the upper portion of surface 40 of cam 39 whereby levers 42 and 34 are held in a position wherein the clutch comprising clutch plate 19 is "out" and the brake comprising brake disk 30 is applied. A holder 5 is placed on the turntable 40, as is shown in Figs. 1 and 4 and operating handle 54 is then moved to pull bolt 41 away from cam 39. As soon as bolt 41 is moved free of cam 39, levers 42 and 34 are released whereupon spring 32 throws the driving clutch to "in" position and releases the brake. The driving shaft 12 is then rotated. The operator holds handle 54 in the position to keep bolt 41 retracted until the machine starts whereupon nose 51 of cam 52 moves away from the lower end of link 49 permitting spring 47 to move catch 45 into engagement with pin 46 to hold bolt 41 in retracted position.

Assume now that reciprocating head 109 is at the bottom of its movement. At this time the end of strip 2 will be clamped between the end of guard 101 and lower cutter 102 by the spring-pressed plate 113. Also, there will have been severed from the end of strip 2 a segment which will be located between the lower end of cutter 9 and clamp 103, the clamp being depressed somewhat below the top edge of lower cutter 102, this being permitted by the support comprising springs 105. Presser foot 9ª will be located in groove 6 of the holder. Now as shaft 12 continues to turn, head 109 will be raised, lifting with it cutter 9, presser foot 9ª and plate 113. As soon as the presser foot leaves groove 6, eccentric 88 operates through pawl 62 and the gearing connections to turn turntable 4 and holder 5 a predetermined amount. Also, eccentric 99 operates pawl 95 to move ratchet wheel 91 one or more notches so as to turn rolls 8 and feed strip 2 forward an amount equal to the width of a segment. As strip 2 moves forward it pushes the previously cut segment off clamp 103 and into groove 106 of the holder, the turning movement of the holder having been completed prior to the time the cut-off segment drops into it. After head 109 reaches the top of its movement it starts to lower again and previous to the time plate 113 reaches guide 101 and the cutter 9 reaches strip 2 the movement of holder 5 and of strip 2 will have been completed. Plate 113 now engages the top of guide 101 to clamp strip 102 and at the same time cutter 9 engages the strip and severs a segment from it. During the severing operation clamp 103 is forced downward by cutter 9 while plate 113 is forced upward against springs 112. At this same time presser foot 9ª enters groove 6 to force the last cut segment down into the groove. Spring 121 in the connection between presser foot 9ª and lever 122 serves to permit upward yielding movement of the presser foot to compensate for the thickness of the ring being built up by the segments. After the down stroke is finished head 109 again raises.

The operation described is repeated at a rapid rate, segments being successively cut from the end of strip 2, transferred to groove 6 and holder 5 and pressed down therein by the presser foot 9ª.

After the desired number of segments has been cut from the strip and transferred to holder 5, nose 51 on cam 52 again engages link 49 swinging it so as to push catch 45 from engagement with pin 46. Bolt 41 is then forced in by spring 44 to a position in which it is again engaged by cam 39 to throw the clutch to out position and apply the brake to shaft 12, thus stopping the machine. The holder 5 having therein a completed ring formed of segments is then removed from turntable 4 and another holder substituted whereupon the machine is again started.

In the present instance a segmental ring of the desired thickness is formed by one complete revolution of shaft 53, and cam 52 is accordingly placed directly on shaft 53. However, the construction in this respect may be varied to meet existing conditions, one or more than one revolution of shaft 53 being utilized in forming a complete segmental ring. Also, one or more revolutions of holder 5 may be utilized in the formation of a ring, it being necessary merely to change the ratio of the gearing for turning the holder.

By having two ratchet wheels 61 on shaft 53 and arranging pawl 62 so that it may be made to engage either of them, two different types of segmental rings may be made by merely shifting the pawl from one ratchet wheel to the other, it being understood that the two ratchet wheels have different numbers of teeth. If still another size of segmental ring is desired, then ratchets 61 may be removed and others substituted for them. Or, if found desirable, the connection 65 may be adjusted to cause pawl 62 to move the ratchet more than one tooth at a time.

In accordance with the provisions of the patent statutes, the principle of operation of the invention has been described together with the apparatus which is now considered to represent the best embodiment thereof, but it is desired to have it understood that the apparatus shown is only illustrative and that the invention may be carried out by other means.

What we claim as new and desire to secure by Letters Patent of the United States, is:

1. In a machine for cutting pieces from material and stacking the pieces one on another in overlapping relation, the combination of a reciprocating cutting means for cutting pieces from the material, step by step means for feeding the material under the cutting means, a holder in front of the cutting means, means for supporting a cut-off piece in alignment with the edge of the material whereby a cut-off piece is transferred to the holder by movement of the material when the material is advanced under the cutting means, and means for imparting turning movement to the holder.

2. In a machine for cutting pieces from material and stacking the pieces one on another in overlapping relation, the combination of a reciprocating cutting means for cutting pieces from the material, step by step means for feeding the material under the cutting means, a holder in front of the cutting means, means for supporting a cut-off piece in alignment with the edge of the material whereby a cut-off piece is transferred to the holder by movement of the material when the material is advanced under the cutting means, means for imparting turning movement to the holder, and means for stopping the machine automatically when a stack is completed.

3. In a machine for forming rings from segments, the combination of a turntable, a holder mounted on the turntable, means for turning the turntable, means for depositing segments in the holder, a driving shaft, a clutch and a brake for the driving shaft, and means controlled by the turntable turning means for throwing the clutch to "out" position and applying the brake when a ring is completed.

4. In a machine for forming rings from segments, the combination of a turntable, a holder mounted on the turntable, means for turning the turntable, means for depositing segments in the holder, a driving shaft, a clutch and a brake for the driving shaft, means controlled by the turntable turning means for throwing the clutch to "out" position and applying the brake when a ring is completed, and means whereby the clutch may be thrown to "out" position and the brake applied manually.

In witness whereof, we have hereunto set our hands this seventeenth day of August, 1927.

FRED GERMAIN,
*Administrator of the Estate of Emile J. Guay, Deceased.*
FREDRICK S. GODFREY.